Figure 1:
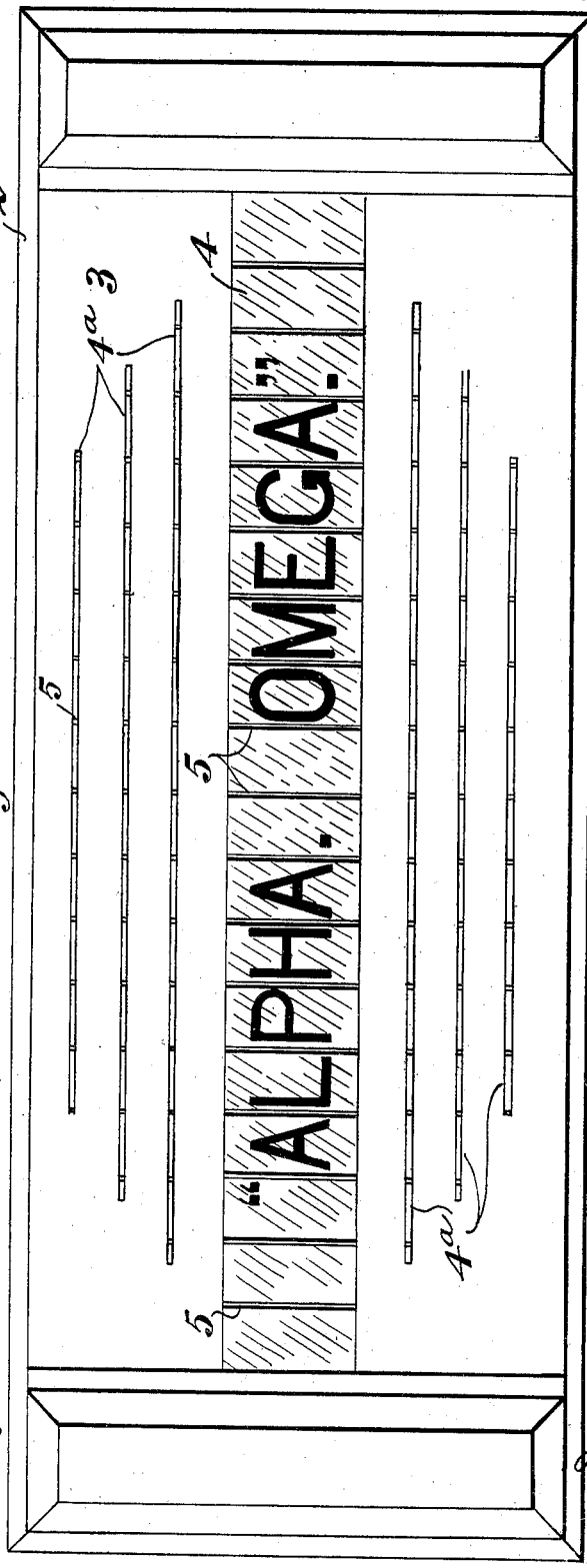

No. 655,627. Patented Aug. 7, 1900.
J. A. KENNEDY-McGREGOR.
ADVERTISING APPARATUS.
(Application filed Aug. 18, 1898.)
(No Model.) 9 Sheets—Sheet 1.

No. 655,627. Patented Aug. 7, 1900.
J. A. KENNEDY-McGREGOR.
ADVERTISING APPARATUS.
(Application filed Aug. 18, 1898.)
(No Model.)
9 Sheets—Sheet 2.
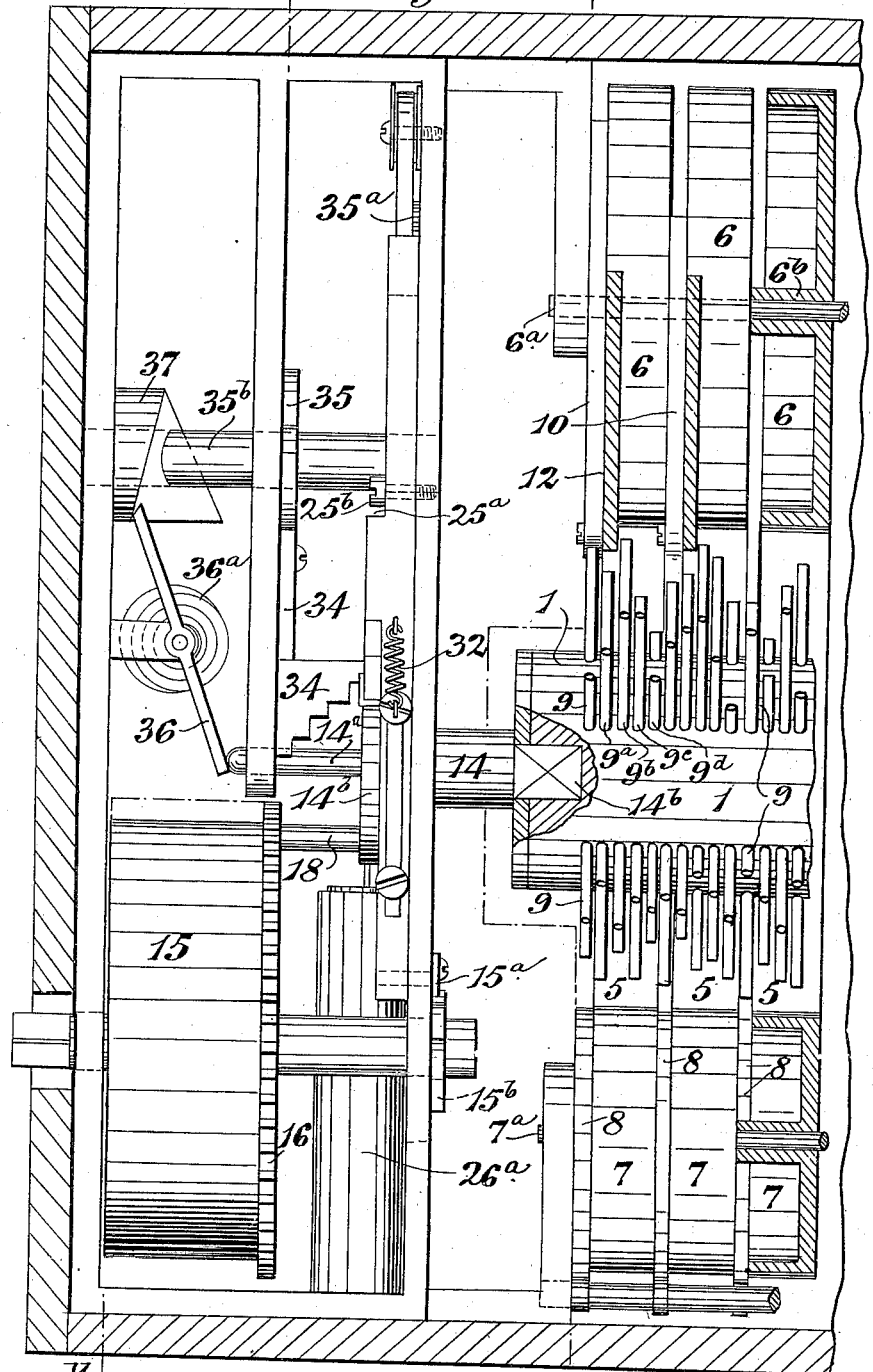

No. 655,627. Patented Aug. 7, 1900.
J. A. KENNEDY-McGREGOR.
ADVERTISING APPARATUS.
(Application filed Aug. 18, 1898.)
(No Model.) 9 Sheets—Sheet 3.
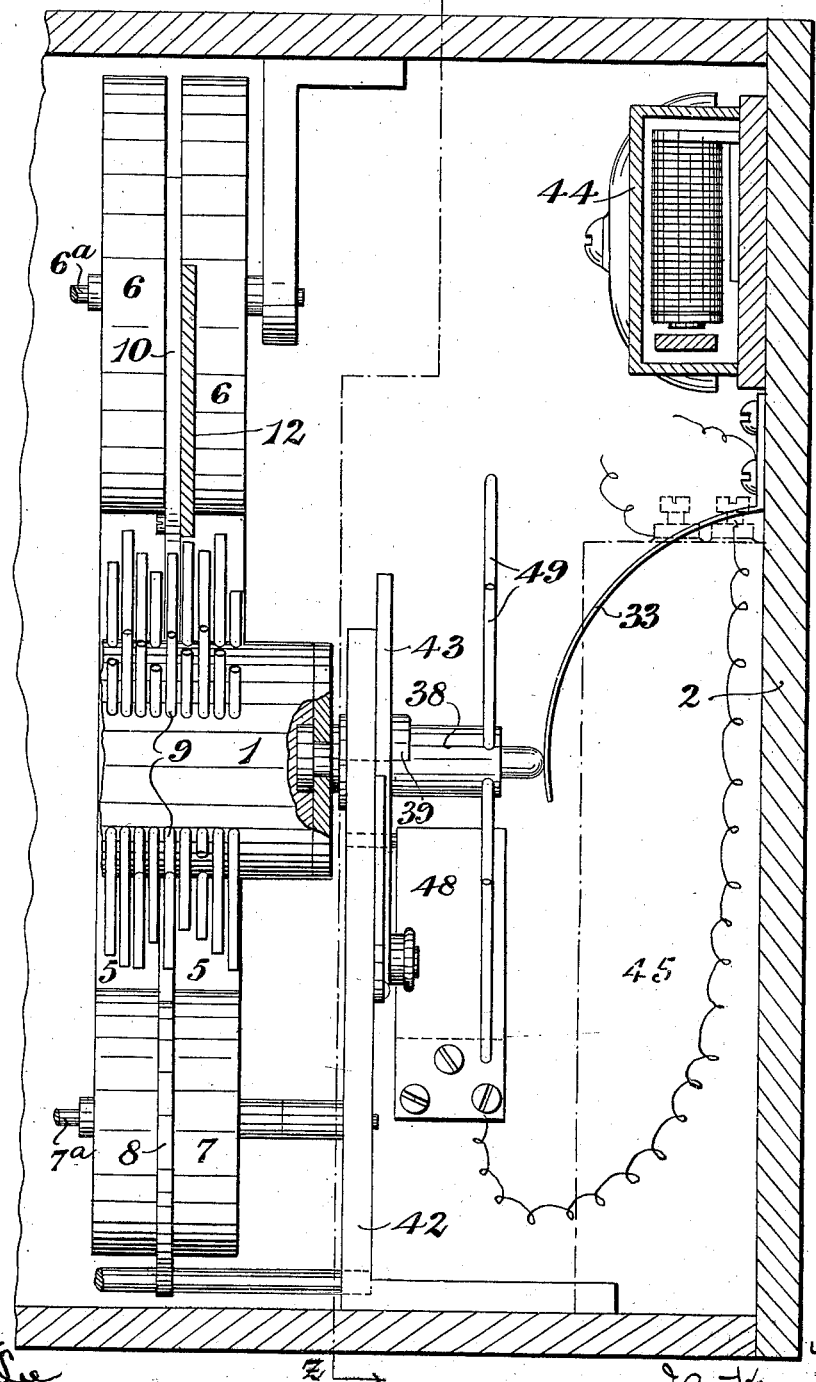
Fig. 2ª

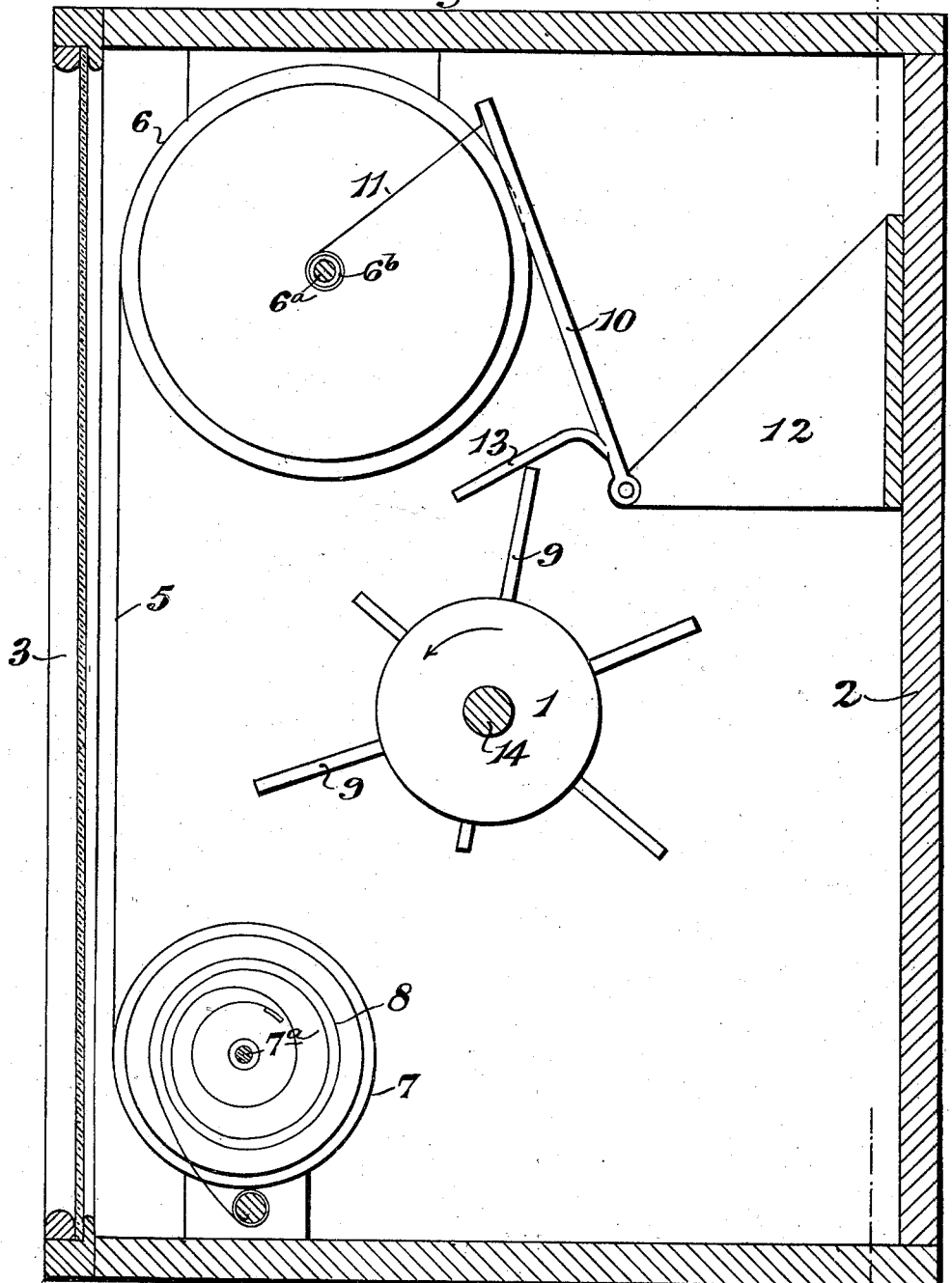

No. 655,627. Patented Aug. 7, 1900.
J. A. KENNEDY-McGREGOR.
ADVERTISING APPARATUS.
(Application filed Aug. 18, 1898.)

(No Model.)

9 Sheets—Sheet 5.

No. 655,627. Patented Aug. 7, 1900.
J. A. KENNEDY-McGREGOR.
ADVERTISING APPARATUS.
(Application filed Aug. 18, 1898.)
(No Model.) 9 Sheets—Sheet 6.

Witnesses
D. H. Lee
A. J. Pope

Inventor
J. A. Kennedy McGregor
per Hubert E. Peck atty

No. 655,627. Patented Aug. 7, 1900.
J. A. KENNEDY-McGREGOR.
ADVERTISING APPARATUS.
(Application filed Aug. 18, 1898.)
(No Model.) 9 Sheets—Sheet 7.
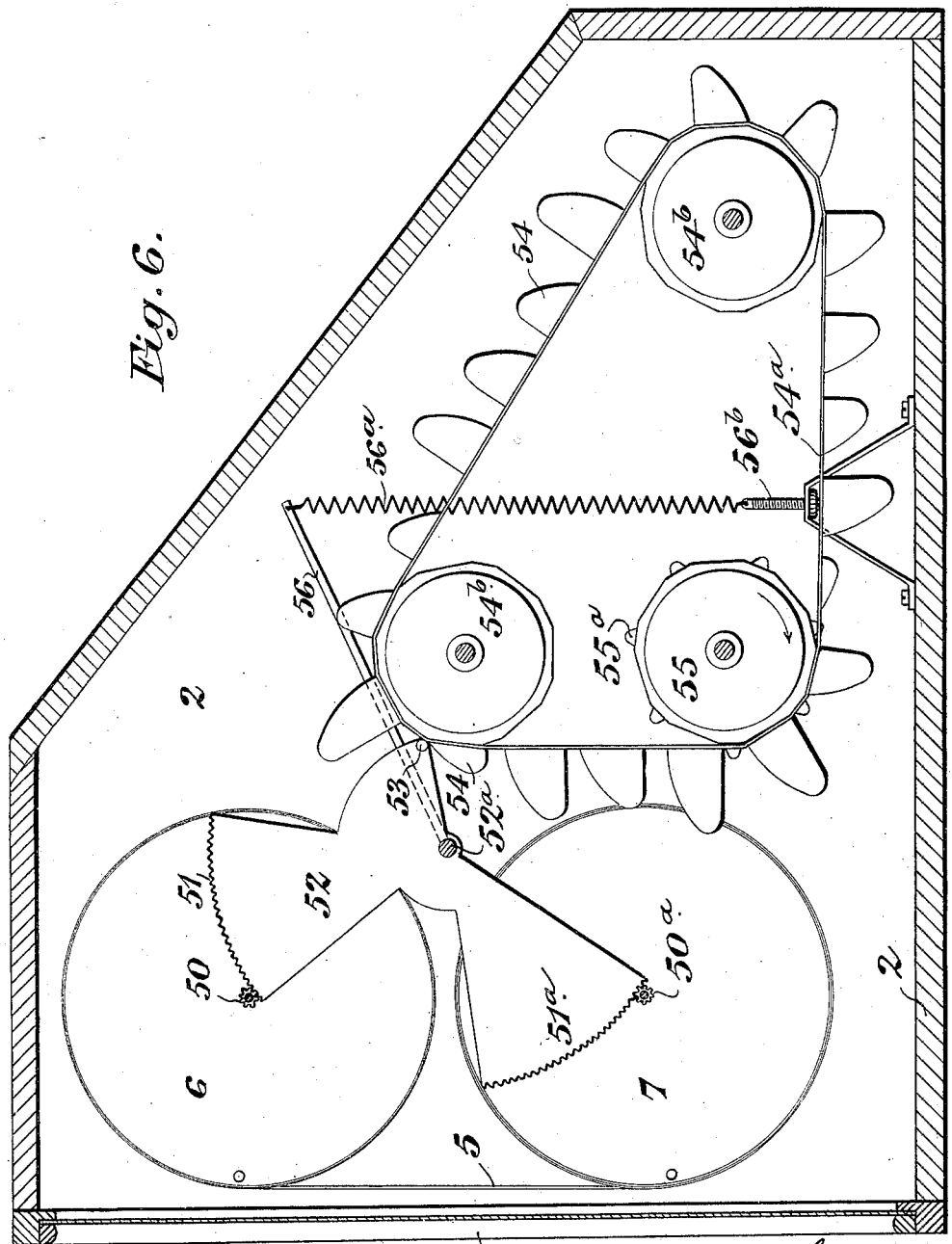

No. 655,627. Patented Aug. 7, 1900.
J. A. KENNEDY-McGREGOR.
ADVERTISING APPARATUS.
(Application filed Aug. 18, 1898.)
(No Model.) 9 Sheets—Sheet 8.
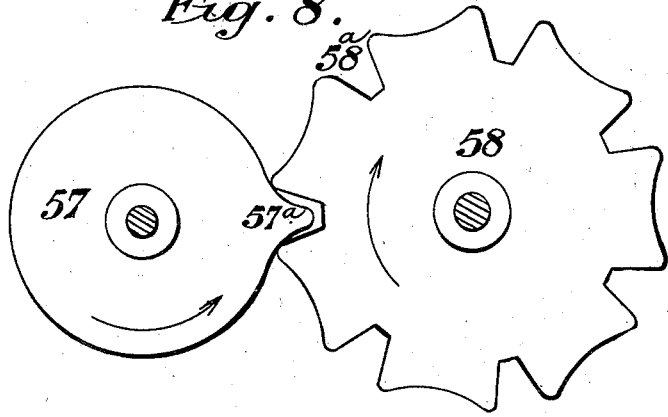
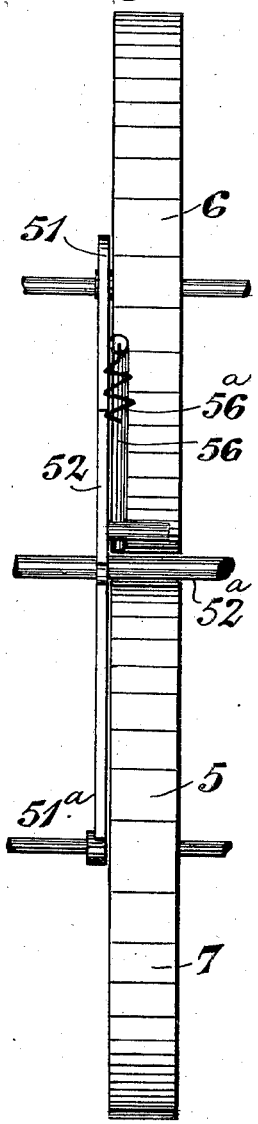
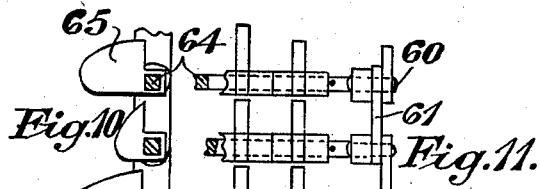
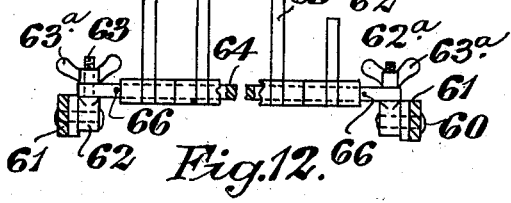

No. 655,627. Patented Aug. 7, 1900.
J. A. KENNEDY-McGREGOR.
ADVERTISING APPARATUS.
(Application filed Aug. 18. 1898.)
(No Model.) 9 Sheets—Sheet 9.

UNITED STATES PATENT OFFICE.

JOHN ALEXANDER KENNEDY-McGREGOR, OF LONDON, ENGLAND.

ADVERTISING APPARATUS.

SPECIFICATION forming part of Letters Patent No. 655,627, dated August 7, 1900.

Application filed August 18, 1898. Serial No. 688,929. (No model.)

*To all whom it may concern:*

Be it known that I, JOHN ALEXANDER KENNEDY-MCGREGOR, a subject of the Queen of Great Britain and Ireland, residing at Hammersmith, London, England, have invented Improvements in Advertising Apparatus, of which the following is a specification.

This invention has reference to a construction of apparatus suitable for advertising and like purposes, whereby with an apparatus of comparatively-small dimensions a large number of advertisements, pictorial devices, or other representations can be displayed in a consecutive and automatic manner. For this purpose the letters, devices, or portions of devices or the like (hereinafter referred to as "letters") to be used in forming the words, pictorial devices, or other representations to be exhibited (hereinafter referred to as "words") are formed on strips of material that are moved lengthwise through suitable connecting mechanism by the action of pins or projections of a determined length and arrangement secured to a movable body that is set in operation at predetermined intervals by a suitable motor. The arrangement is such that when the body is operated the pins will act to quickly move the strips lengthwise, so as to bring opposite an opening or openings in the front of the apparatus the proper letters on adjacent bands to form the word or words it is desired to exhibit, which words are held in a position to be seen for a short time, after which the body is again set in motion and a fresh set of pins brought into position to operate the strips and produce a different word or set of words, these actions being repeated a great many times.

As will be obvious, apparatus to act in the manner described can be constructed in various forms.

In the accompanying illustrative drawings, Figures 1 to 5, inclusive, show one arrangement of apparatus in accordance with this invention, Fig. 1 being a front view, Figs. 2 and 2ª together a vertical longitudinal section on the line *w w* of Fig. 3 and to a larger scale than Fig. 1, and Figs. 3, 4, and 5 vertical cross-sections on the lines *x x*, *y y*, and *z z*, respectively, of Figs. 2 and 2ª. Figs. 6 to 8, inclusive, and Figs. 9 to 12, inclusive, respectively illustrate modifications of portions of the apparatus to be hereinafter described.

The apparatus shown in Figs. 1 to 5, inclusive, comprises a rotary pin-barrel 1, arranged horizontally within a casing 2, in the front wall 3 of which is a slot, opening, or glazed aperture 4, through which the advertisements to be exhibited can be seen. In these figures the glass front is shown as being opaque, except at the transparent aperture 4. It may also have transparent slits 4ª, through which the strips 5 may be seen. The strips 5, carrying the letters, are arranged parallel with one another behind the front wall 3 of the casing, and each of them is secured at its ends to the peripheries of two drums 6 and 7, Fig. 3, arranged, respectively, at the upper and lower parts of the casing 2, one of which is provided with a coiled spring 8, so as to constitute it a spring-drum. The upper drums 6 and the lower ones 7 are mounted on suitably-supported shafts 6ª and 7ª, respectively, that are common to the two series of drums and on which the several drums can rotate independently of each other.

9 indicates pins suitably fixed in the barrel 1, so that they and the barrel somewhat resemble the pin-barrel of a musical box or barrel-organ, the barrel being arranged to be rotated intermittently and shifted longitudinally in a step-by-step manner and bring the pins 9 successively into contact with levers 10 for moving the strips 5 by means of suitable mechanism lengthwise to the desired extent to bring the proper letter thereon into position to be seen. The pins are arranged in longitudinal rows all around the periphery of the drum, (six rows are shown in Fig. 3,) the pins being divided into longitudinal groups, which may, as in the example shown, (see Fig. 2,) comprise five sets of pins 9, 9ª, 9ᵇ, 9ᶜ, and 9ᵈ, measuring lengthwise of the cylinder, Fig. 2, and each set comprising six pins arranged around the drum. The pins of the successive groups and of each group are arranged to project to a predetermined length, according to the particular letter to which each of them corresponds. The boss 6ᵇ of each of the upper drums 6 is connected by a flexible connector 11 to one end of a lever 10, pivoted to a support 12 and provided with an arm 13, that projects into the path of one of the sets of pins 9 of each longitudinal group of pins. As will be seen, the arrangement is such that each time a pin of a group is brought into contact with the arm 13 of the corresponding lever 10 it operates the latter and causes it, through the flexible connection 11, to rotate the corresponding upper drum 6 and unwind the strip 5 from the lower drum 7 against the action of the spring 8 and wind it upon the upper drum, the extent of movement of the strip and the particular letter left exposed at the front of the casing when the barrel 1 is arrested depending upon the length of the particular pin 9 that has been used.

When the barrel has been rotated in a step-by-step manner through a complete revolution, it is moved endwise, so as to bring into operation at the next rotation of the barrel the next set of pins in the successive groups of pins, these new pins being of a length to produce a new combination of words.

Mechanism of various kinds may be employed (a) for rotating the pin-barrel in an intermittent or step-by-step manner, (b) for moving the barrel endwise in one direction for a short distance after each complete rotation, so as to bring a different set of pins in each group into operation, and (c) for moving the barrel endwise back into its original position after being rotated a number of times (in this example five times) corresponding to the number of set of pins in each longitudinal group of pins.

Figure 4:
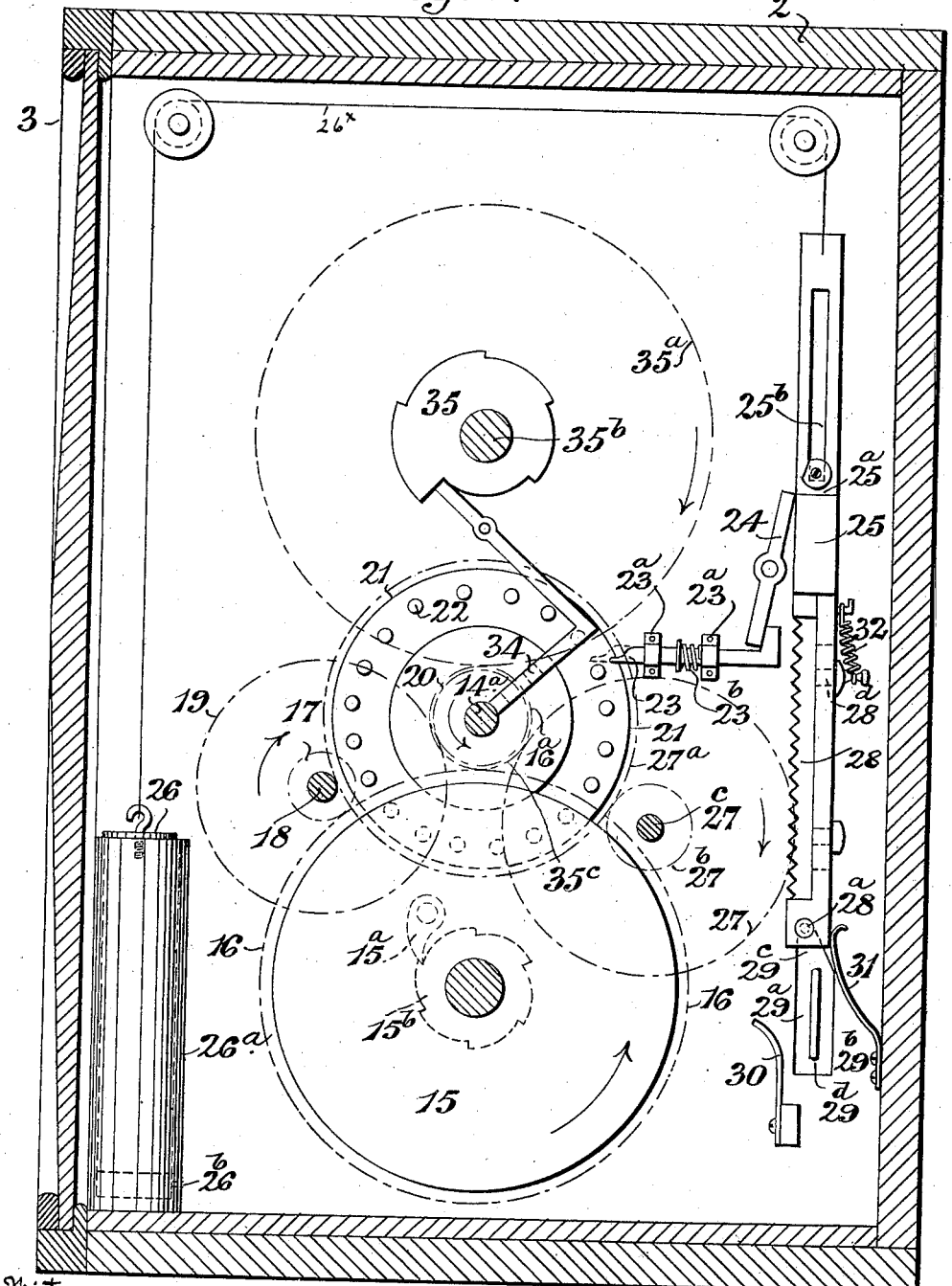
Figure 5:
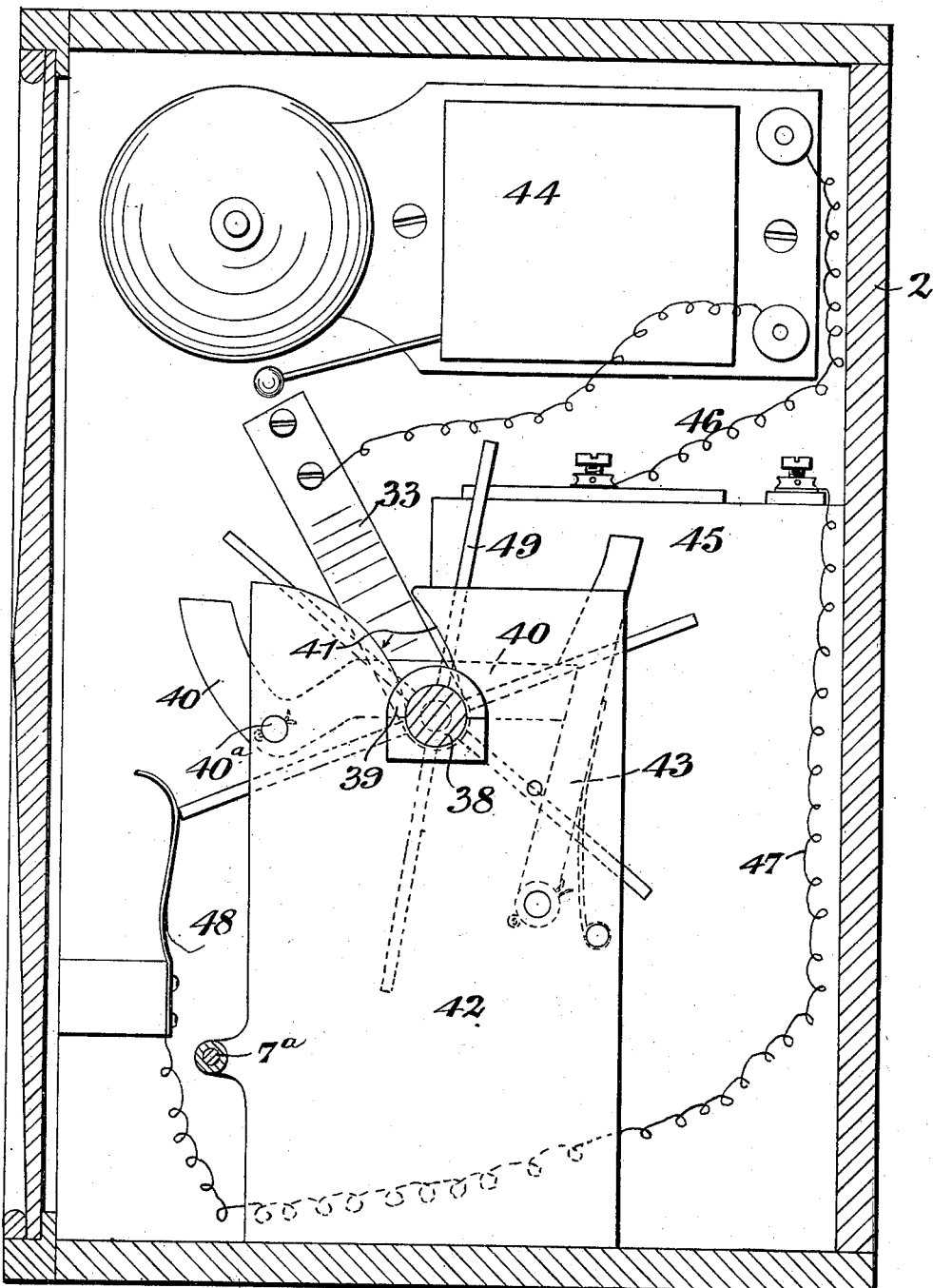

In the arrangement now being described the pin-barrel 1 is intermittently rotated by a spindle 14, driven from a spring-drum through suitable gearing, which comprises a toothed wheel 16, Fig. 4, fixed to the drum 15 and gearing with a pinion 17, fixed to a spindle 18, on which is feathered a toothed wheel 19, in gear with a pinion 20, feathered to an extension $14^a$ of the spindle 14. Connected to the wheel 20 is a wheel 21, provided with pins or projections 22, that are successively arrested by a spring-detent consisting, it may be, of a spring-bolt 23, arranged to slide in fixed bearings $23^a$, and the spring $23^b$, which tends to hold the bolt in the path of the pins. In conjunction with this spring-bolt 23 there is provided a lever 24, operated and controlled by a reciprocating bar 25, which when moved upward causes the lever 24 to withdraw the spring-detent 23 and allow the spring-drum 15 to partly rotate the pin-barrel 1 and when moved downward releases the lever and allows the spring-detent to move back into its locking position (shown by dotted lines in Fig. 4) and arrest the action of the spring-drum 15 and stop the pin-drum 1. The reciprocating bar 25 is stepped at $25^a$ and is moved upward to withdraw the spring-detent by a weight 26, connected by a flexible connection $26^\times$ to the said bar and arranged to descend within a vessel $26^a$, provided with a small hole $26^b$, through which the air can only escape slowly after the manner of a dash-pot. The said bar and weight are moved in the opposite direction by a wheel 27, that gears with a rack 28, connected to the said bar, and is driven from the spring-drum through a toothed wheel $27^a$, that is in gear with a toothed wheel $27^b$, feathered upon the spindle $27^c$. To allow the rack 28 to be thrown into gear with the toothed wheel 27 when it reaches the upper end of its travel and to be disengaged from the wheel at the bottom of its travel, the upper part of the bar 25 is guided by a pin-and-slot arrangement $25^b$, about which it can turn, and the lower end of the bar is provided with a guide-pin $28^a$, arranged to work in a cam-groove comprising two vertical parallel portions $29^a$ $29^b$, connected at the top by horizontal and inclined portions $29^c$ and at the bottom by a horizontal portion $29^d$. The arrangement, as will be seen, is such that when the rack 28 is in gear with the wheel 27 and is moved downward thereby the guide-pin $28^a$ descends the vertical portion $29^a$ of the cam-groove until the bar 25 reaches the bottom of its travel, when the guide-pin $28^a$ is pressed laterally and away from the wheel 27 by a spring 30 into a position below the vertical portion $29^b$ of the groove, thereby disengaging the rack from the wheel. The bar and rack then ascend, the guide-pin traveling in the groove $29^b$ until the bar nearly reaches the upper end of its stroke, when it is pressed toward the wheel 27 by another spring 31, which is weaker than the spring 30, so as to bring the rack 28 again into gear with the said wheel. To insure engagement of the rack and wheel, the former is provided with wedge-shaped teeth and is so mounted on the bar 25—as, for example, by providing it with a pin $28^d$, extending through a slot (shown by dotted lines in Fig. 4) in the bar—that it is able to slide endwise on the bar against the action of a spring 32 and adjust itself into gear with the wheel.

The pin-barrel 1 and its driving-spindle 14 are according to one arrangement moved endwise by a spring 33, so as to press a disk $14^b$, which is fast on the spindle extension $14^a$, against a stepped stop 34, which at each complete rotation of the pin-drum is moved by a rotary stepped cam 35 sufficiently to bring the next adjacent step on the stop 34 opposite the disk $14^b$ and allow the pin-drum and spindle to be moved endwise in a forward direction (to the left in Fig. 2) through a distance sufficient to bring the next set of pins 9 of the successive groups of pins into the operative position. The stepped stop 34 and cam 35 have each as many steps as there are circular sets of pins in each longitudinal group of pins. In this case there are five. The cam is carried by a wheel $35^a$, fixed upon a spindle $35^b$ and driven from a toothed wheel $35^c$, feathered upon the spindle 14. The spindle extension $14^a$ is arranged opposite a lever 36, Fig. 2, which is connected to one end of a coiled spring 36ª, in which energy is stored during the rotation of the drum by a cam 37, fixed on the shaft 35ᵇ, and which prevents the lever 36 from turning backward until the pin-barrel has completed its rotation when in its most forward position, whereupon the cam releases the lever 36 and allows the spring 36ª to react and return the pin-drum and spindle to their original positions against the pressure of the spring 33, after which the above-described operations will be repeated. When there are five sets of pins 9 in each longitudinal group of pins, as in the present example, the shaft 35ᵇ, carrying the two cams 35 and 37, is caused to make one revolution for five revolutions of the pin-drum 1. The toothed wheels 19, 20, 27, 27ª, 27ᵇ, 35ᶜ, and 35ª and pin-wheel 21 are behind the bar 25 in Fig. 2, so that they cannot be seen in this figure.

To enable the pin-barrel 1 to be readily removed and replaced, it may be slipped at one end over a squared part 14ᵇ of the driving-spindle and be provided at the other end with a spindle 38, mounted in a sleeve-bearing 39, the upper half of which is carried by an arm 40, which is pivoted at 40ª, and is arranged to move about a curved slot 41 in a fixed bracket 42 and is held in position by a spring-catch 43, pivoted to the bracket 42, and adapted to engage with the end of the said pivoted arm.

Each change of the exhibited device may be notified by an electric bell 44.

45 is a galvanic cell connected by leads 46 and 47 to one terminal of the bell 44 and a spring-contact 48, respectively. The other terminal of the bell is connected with the spring 33, which is constantly in contact with the end of the spindle 38 of the pin-barrel. The circuit is completed by means of a series of radial arms or pins 49, corresponding in number to the radial rows of pins 9 on the pin-barrel and rotating therewith, the arrangement being such that at the moment when each change is effected one of the pins or arms 49 comes against the spring-contact 48 and closes the bell-circuit.

In some cases means may be provided for illuminating the letters, so that they can be seen at night. For this purpose electric or other lamps or lights may be used arranged within the casing 2 behind the strips 5, or the letters may be illuminated by light thrown onto them from the front.

Fig. 6 is a transverse section, and Figs. 7 and 8 are detail views, showing a modified arrangement. In this case the drums 6 and 7 of each pair corresponding to a movable strip 5 are of equal diameter and provided with small pinions 50 50ª, respectively, that gear with toothed segments 51 51ª of an oscillating plate 52. This plate rotates on an axle 52ª and is provided with a pin or bowl 53, which is arranged in the path of a series of cam-like projections 54, of various heights, mounted upon an endless chain or band 54ª, which passes around guide-pulleys 54ᵇ and a sprocket-wheel 55, which latter is partly rotated at intervals from the spring or other motor, its teeth 55ª engaging in suitably-arranged openings in the chain or band 54ª. The arrangement is such that as each projection 54 presses up the pin 53 the segments 51 51ª are oscillated to a corresponding extent and move the corresponding drums 6 and 7 and strip 5 so as to bring the corresponding representation or device opposite the transparent aperture 4, Fig. 1, in the front of the casing. After each projection has been moved past the pin 53 the strip is returned to its normal position by means of an arm 56, fixed to the axle 52ª and connected at its free end to a spiral spring 56ª, the tension of which may be adjusted by means of a screwed pin and milled nut 56ᵇ. The sprocket-wheel 55 may be rotated by means of the gear shown in Fig. 8. The wheel 57 has one tooth 57ª and receives continuous rotation from the motor of the apparatus, the arrangement being such that at each complete rotation of the wheel 57 its tooth 57ª engages with one of the notches 58ª of the wheel 58 and gives to the latter a partial rotation, the parts being so arranged that the pin 53 will remain stationary upon the top of the cam-like projection for the time being in action, while the wheel 57 is rotating idly.

Figure 9:
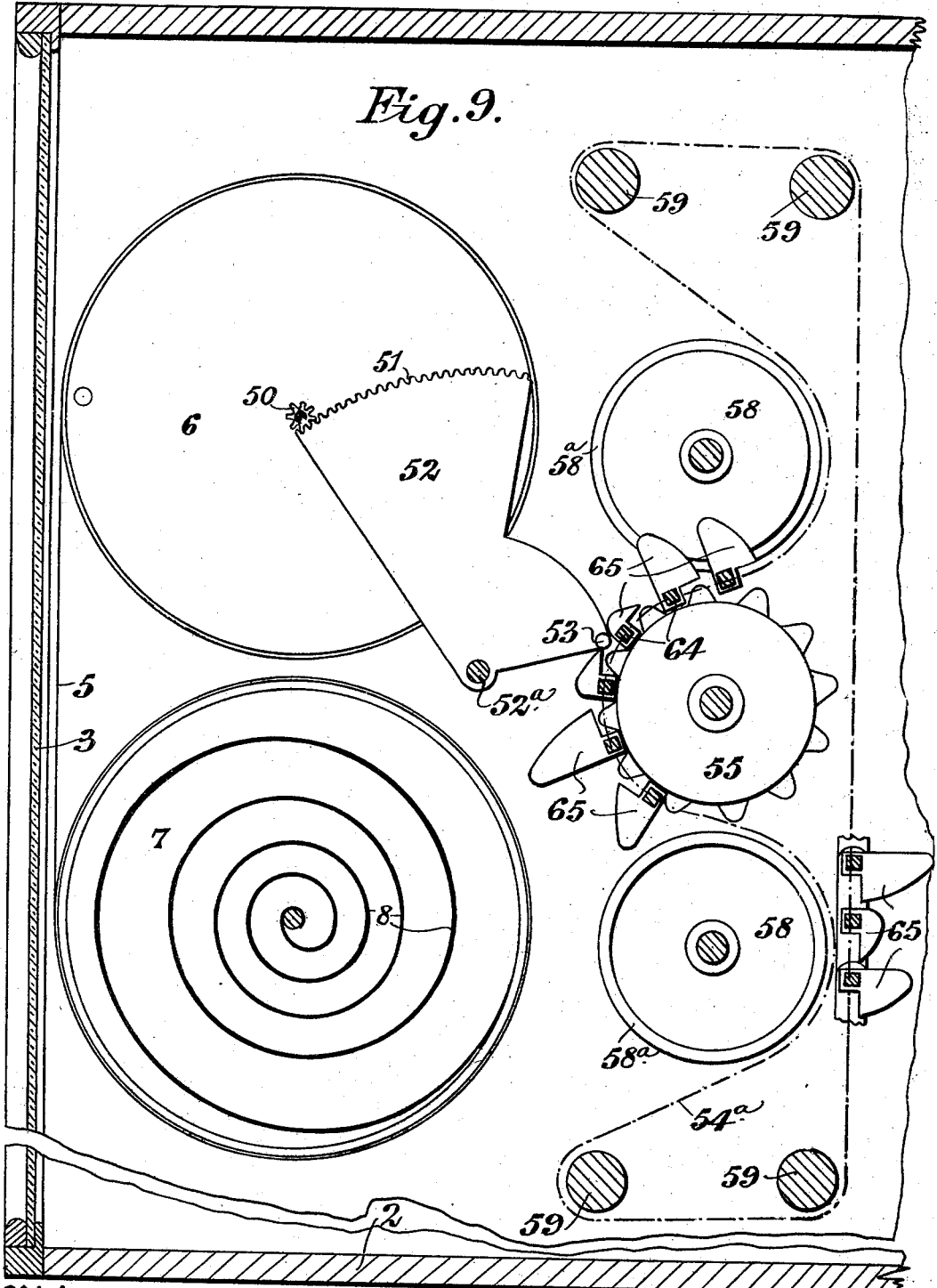

Fig. 9 shows a further modification wherein each lower drum 7 is provided with a coiled spring 8 for the purpose of returning the strip 5 to its normal position, as in Fig. 3; but the upper drum is provided with a pinion 50, in gear with a toothed segment on a plate 52, provided with a pin or bowl 53, arranged in the path of a series of pins or projections 65, carried by an endless chain 54ª, that receives its motion from the intermittently-driven sprocket-wheel 55. 58 58 are guide-rollers, preferably formed with rims 58ª to retain the chain in place. 59 represents other guide-rollers about which the chain travels.

Figs. 10, 11, and 12 show, respectively, in longitudinal section, plan, and sectional end elevation part of a chain with pins or projections 65, that may advantageously be used in the apparatus shown in Figs. 6 to 9, inclusive. The rivets or pins 60 of the chain-links 61 are extended inwardly and each fitted with a nut 62, formed with a screw-threaded extension 63, so that a cross-bar 64 of square cross-section can be readily fixed by thumb-nuts 63ª to each transverse pair of nuts. The pins or cam-like projections 65 are threaded on the cross-bars and retained in place thereon by pins 66.

As will be obvious, apparatus for operating the strips by means of pins or projections in the manner set forth can be variously modified without departing from the essential feature of the invention.

In some cases each lengthwise-movable strip may be composed of a number of detachable sections on which a letter or other character or device is printed or otherwise placed, so that the word or other representation to be exhibited can be readily changed without having to vary the operating mechanism.

The letters or the like may be variously formed. They may be formed as stencils or as opaque letters on a transparent or translucent ground, or vice versa, as well understood, so that they can be seen by reflected light during the day and by transmitted light at night.

What I claim is—

1. In an apparatus of the character described the combination of a series of independent flexible carriers arranged side by side and movable lengthwise, independent actuating mechanism adapted to move each carrier separately in one direction and independently of the other carriers, variable controlling mechanism operating each actuating mechanism to move all of said carriers simultaneously and each carrier to variable predetermined distances, means adapted to return the carriers to their normal position after each movement and driving means, substantially as described.

2. In an apparatus of the character described, the combination of a series of independent and parallel flexible carriers arranged side by side and approximately in the same plane and provided with characters for exhibition, yielding means for separately moving each of said carriers in one direction, actuating mechanism adapted to move each carrier separately in one direction and independently of the other carriers, controlling mechanism for operating simultaneously all the actuating mechanism and determining the extent of movement thereof, means adapted to return the carriers to their normal position after each movement, and driving means, substantially as described.

3. In an apparatus of the character described, the combination of a case having an opening, a series of independent parallel and longitudinally-movable flexible carriers arranged to move lengthwise side by side behind said opening and each provided with a longitudinal series of representations arranged to be separately displayed behind said opening, whereby various combinations of the representations of the carriers can be displayed, independent operating mechanism adapted to move each of said carriers longitudinally and independently through a variable and predetermined distance, controlling mechanism adapted to actuate simultaneously the operating mechanism of the several carriers to variable extents means adapted to return the carriers to their normal position after each movement, and driving means for said controlling mechanism, substantially as described.

4. In an apparatus of the character described, a number of pairs of drums arranged with the axes of each pair parallel and one above the other, a series of independent and parallel longitudinally-movable flexible carriers arranged side by side, each of said carriers being wound on a separate pair of said drums, lever and rotary mechanisms for moving each carrier independently of the others through a variable predetermined distance, controlling and actuating means therefor adapted to move said carriers simultaneously and to different extents, and means adapted to return the carriers to their normal position after each movement, substantially as described.

5. In an apparatus of the character described, a series of independent and parallel longitudinal flexible carriers arranged side by side, independent supports for the several carriers, independent sets of actuating means adapted to move each of said carriers independently and longitudinally to a variable predetermined distance and thereby form the desired combination of characters, series of fingers or projections of various lengths to operate said actuating means to periodically move said carriers simultaneously and independently through various and predetermined distances, and means adapted to return the carriers to their normal position after each movement, substantially as described.

6. In an apparatus of the character described, a series of independent and longitudinally-movable parallel flexible carriers arranged side by side, each carrier having a series of characters to be separately displayed, independent supports for the several carriers, independent operating mechanism for each carrier, series of controlling and actuating means, one for each operating mechanism constructed and arranged to move the operating mechanisms simultaneously at intervals and to variable distances, means adapted to return the carriers to their normal position after each movement, and driving means, substantially as described.

7. In an apparatus of the character described, a series of independent and longitudinally-movable flexible carriers arranged side by side, each carrier having operating means independent of the operating means of the other carriers, independent sets of long and short movable projections or fingers for moving said independent sets of operating means and consequently said carriers through variable distances, a set of said projections being provided for each operating means, mechanism for simultaneously driving the several sets of projections, and means adapted to return the carriers to their normal position after each movement, substantially as described.

8. In an apparatus of the character described, the combination of a series of independent and parallel longitudinally-movable carriers arranged side by side and portions of which are displayed at intervals, independent supports for said carriers, and sets of movable projections arranged to move each of said carriers independently through a variable and predetermined distance, each set of projections comprising projections of various lengths acting on a particular strip and arranged to move the carrier periodically and to hold the same inactive for a short period after each movement, mechanism for moving all of said sets of projections simultaneously and means adapted to return the carriers to their normal position after each movement, substantially as described.

9. In an apparatus of the character described, the combination of a series of independent elements each comprising a loaded drum and a winding-drum arranged at a distance apart and parallel to one another, a carrier mounted on said drums, a lever mechanism to unwind the carrier from the loaded drum against the load acting thereon and arranged to release the carrier periodically so that it can be rewound on the loaded drum, and sets of projections of various lengths successively acting on said lever mechanism to move the same various predetermined distances and hold the same a short time at each movement, means adapted to return the carrier to its normal position after each movement and driving means for simultaneously operating the sets of projections corresponding to all the elements, substantially as described.

Signed at London, England, this 5th day of August, 1898.

JOHN ALEXANDER KENNEDY-McGREGOR.

Witnesses:
PERCY E. MATTOCKS,
WM. O. BROWN.